United States Patent
Wang et al.

(10) Patent No.: US 11,859,704 B2
(45) Date of Patent: Jan. 2, 2024

(54) FOUR-MODE DUAL-MOTOR COUPLING ELECTRIC DRIVE AXLE

(71) Applicant: Jilin University, Changchun (CN)

(72) Inventors: Junnian Wang, Changchun (CN); Changyang Guan, Changchun (CN); Tianhui Zheng, Changchun (CN); Chunlin Zhang, Changchun (CN); Zhe Liu, Changchun (CN); Zidong Zhou, Changchun (CN); Shoulin Gao, Changchun (CN)

(73) Assignee: Jilin University, Changchun (CN)

( * ) Notice: Subject to any disclaimer, the term of this patent is extended or adjusted under 35 U.S.C. 154(b) by 0 days.

(21) Appl. No.: 18/064,193

(22) Filed: Dec. 9, 2022

(65) Prior Publication Data

US 2023/0117280 A1    Apr. 20, 2023

(30) Foreign Application Priority Data

Dec. 22, 2021    (CN) .......................... 202111578797.X

(51) Int. Cl.
  *B60K 1/02*    (2006.01)
  *F16H 48/36*    (2012.01)
  (Continued)

(52) U.S. Cl.
  CPC ............... *F16H 48/36* (2013.01); *B60K 1/02* (2013.01); *B60K 17/165* (2013.01);
  (Continued)

(58) Field of Classification Search
  CPC ...... F16H 48/36; F16H 37/0806; F16H 48/11; F16H 48/22; F16H 48/38; F16H 57/031; F16H 57/037; F16H 2048/106; F16H 2048/364; F16H 2057/02034; F16H 2057/02052; B60K 1/02; B60K 17/165; B60K 2001/001

See application file for complete search history.

(56) References Cited

U.S. PATENT DOCUMENTS 5,372,213 A * 12/1994 Hasebe .................... B60K 1/02
                                                      184/6.12
9,593,721 B2 * 3/2017 Strandberg ............... B60K 1/00
(Continued)

FOREIGN PATENT DOCUMENTS

CN        104675951 A      6/2015
CN        106965660 A *    7/2017   ............... B60K 1/02
(Continued)

*Primary Examiner* — Sherry L Estremsky

(57) ABSTRACT

A four-mode dual-motor coupled electric drive axle, including a primary drive motor, an auxiliary drive motor, a reducer, a torque vectoring (TV) coupler, a power coupling differential, a housing, and a power output mechanism. The TV coupler is switchable among disconnected mode, TV mode, and reducer mode by controlling a first clutch and a second clutch. The power coupling differential is switchable between torque coupling mode and speed coupling mode by controlling a third clutch. The electric drive axle is switchable among single-motor drive mode, TV drive mode, dual-motor torque coupling drive mode, and dual-motor speed coupling drive mode by controlling the TV coupler and the power coupling differential.

8 Claims, 6 Drawing Sheets

(51) Int. Cl.
  *B60K 17/16* (2006.01)
  *F16H 37/08* (2006.01)
  *F16H 48/11* (2012.01)
  *F16H 48/22* (2006.01)
  *F16H 48/38* (2012.01)
  *F16H 57/031* (2012.01)
  *F16H 57/037* (2012.01)
  *F16H 48/10* (2012.01)
  *F16H 57/02* (2012.01)

(52) U.S. Cl.
  CPC ......... *F16H 37/0806* (2013.01); *F16H 48/11* (2013.01); *F16H 48/22* (2013.01); *F16H 48/38* (2013.01); *F16H 57/031* (2013.01); *F16H 57/037* (2013.01); *F16H 2048/106* (2013.01); *F16H 2048/364* (2013.01); *F16H 2057/02034* (2013.01); *F16H 2057/02052* (2013.01)

(56) References Cited

U.S. PATENT DOCUMENTS

| | | | |
|---|---|---|---|
| 9,593,754 B2 | 3/2017 | Sten | |
| 9,855,830 B2 * | 1/2018 | Knoblauch | ............. B60K 1/00 |
| 10,065,489 B2 | 9/2018 | Wang et al. | |

FOREIGN PATENT DOCUMENTS

| | | | | |
|---|---|---|---|---|
| CN | 113400864 A | 9/2021 | | |
| CN | 113415107 A | 9/2021 | | |
| CN | 106965660 B * | 3/2023 | ............. | B60K 1/02 |
| DE | 102021006124 B3 * | 3/2023 | | |

\* cited by examiner

--- Control signal cables and power supply cables of electromagnetic clutches

◄------ Torque flow of the primary drive motor

FOUR-MODE DUAL-MOTOR COUPLING ELECTRIC DRIVE AXLE

CROSS-REFERENCE TO RELATED APPLICATIONS

This application claims the benefit of priority from Chinese Patent Application No. 202111578797.X, filed on Dec. 22, 2021. The content of the aforementioned application, including any intervening amendments thereto, is incorporated herein by reference in its entirety.

TECHNICAL FIELD

This application relates to electric vehicle transmissions, and more particularly to a four-mode dual-motor coupling electric drive axle.

BACKGROUND

In order to mitigate the environmental pollution and continuous petroleum consumption caused by traditional fuel vehicles, electric vehicles (EVs) featuring zero emission, high integration, fast dynamic response, and precise control have been developed rapidly and widely popularized in recent years. However, domestic high-performance electric vehicle technologies still lag behind foreign electric vehicle manufacturers such as Tesla.

Electric vehicle drive systems mainly include centralized drive systems and distributed drive systems.

The centralized drive system mainly includes the commonly used single-motor electric drive axle systems and dual-motor coupling electric drive axle systems. The dual-motor coupling electric drive axle system has two coupling schemes: dual-motor torque coupling and dual-motor speed coupling. The torque coupling can effectively improve the acceleration and climbing performance of the vehicles, allowing for better power performance. The speed coupling can make the motor work more frequently in the high-efficiency range, allowing for better driving economy.

The distributed drive system is a new drive mode represented by the hub-motor independent drive system. The torque vectoring (TV) based on distributed drive can ensure the stable driving of the vehicle and the vectoring distribution of drive torque between the left and right wheels, which can improve the trafficability, agility, maneuverability, power performance, and economic efficiency of the electric vehicles. Compared with the traditional electronic stability program/vehicle dynamic control (ESP/VDC) based on differential braking, the TV technology can be directly applied to the control and distribution of the drive torque, which can avoid power loss and contribute to better driving pleasure.

However, due to the limited increase in power density of the hub motor, the large unsprung mass, and the high requirements for sealing and reliability, the distributed hub motor drive system has not yet been widely used in passenger vehicles, and merely used in some commercial vehicles. Therefore, the centralized drive system is still the predominant drive form for electric vehicles at present. It is of great practical significance to integrate the independent torque control of wheels of the hub-motor drive system into the centralized drive vehicles to realize the TV. Currently, this scheme has been applied in some high-end traditional fuel sport utility vehicles (SUVs), but is not highly popular due to the high cost. Its application in electric vehicles has been rarely reported so far. Therefore, it is of great practical significance to design an electric drive axle with a TV function for electric vehicles.

Chinese patent publication No. 104675951A, titled "Electric Differential with Dual-planetary Gear Set Mechanism", and U.S. patent Ser. No. 10/065,489B2, titled "Drive Axle of Electric Distribution Torque", recite a TV drive axle based on the dual-motor centralized arrangement, in which a TV motor is introduced to the centralized drive axle to realize the torque vectoring distribution between the left and right wheels. This design has small energy loss and precise control compared with the TV differential commonly used in the existing high-end SUVs. However, since the TV is only available for limited steering conditions, it is not cost-effective to introduce a TV motor in light of the additional churning loss and energy consumption.

Therefore, considering that the application conditions of the TV technology are partially complementary to those of the dual-motor coupling technology, when the dual-motor coupling drive axle is configured to be switched between the TV function and dual-motor coupling function, the technical advantages of the TV function and the dual-motor coupling function can be achieved simultaneously, significantly improving the utilization efficiency of the auxiliary drive motor and enhancing the driving pleasure, power performance, economic efficiency, handling stability, maneuverability, and trafficability of the vehicles under various operation conditions. Therefore, this technical solution has great application potential in high-end electric vehicles.

SUMMARY

An object of the present disclosure is to provide a dual-motor coupling electric drive axle having a torque vectoring (TV) function, which has four operating modes, respectively single-motor drive mode, TV drive mode, dual-motor torque coupling drive mode, and dual-motor speed coupling drive mode. The four-mode dual-motor coupling electric drive axle can be switched between the four operating modes by control ling the operating state of three clutches and the operating mode of the relevant assembly.

When the four-mode dual-motor coupling electric drive axle operates in the single-motor drive mode, only the primary drive motor outputs power, and the vehicle can travel with low energy consumption.

When the four-mode dual-motor coupling electric drive axle is switched to the TV drive mode, the drive torque output from the primary drive motor can be arbitrarily distributed between the wheels under the action of the torque output from the auxiliary drive motor, which can effectively improve the trafficability, maneuverability, handling stability, power performance, economic efficiency, and driving pleasure of the vehicle.

When the four-mode dual-motor coupling electric drive axle operates in the dual-motor torque coupling drive mode, torques output from the primary drive motor and the auxiliary drive motor are coupled to drive the vehicle together. In this case, the four-mode dual-motor coupling electric drive axle has a large transmission ratio, and the vehicle has better dynamics performance.

When the four-mode dual-motor coupling electric drive axle operates in the dual-motor speed coupling drive mode, the speed of the primary drive motor is coupled with the speed of the auxiliary drive motor, where the auxiliary drive motor acts as a speed control motor, so that the primary drive motor can work more in the high-efficiency range. In this case, the four-mode dual-motor coupling electric drive axle has a small transmission, and the vehicle has a higher drive efficiency and better economic efficiency.

Technical solutions of the present disclosure are described as follows.

This application provides an electric drive axle, comprising:
- a primary drive motor;
- an auxiliary drive motor;
- a reducer;
- a torque vectoring (TV) coupler;
- a power coupling differential;
- a housing assembly; and
- a power output mechanism;
- wherein the primary drive motor is a hollow-shaft inner-rotor permanent magnet synchronous motor; an outer housing stator of the primary drive motor is fixed; an inner rotor of the primary drive motor is configured as an output shaft of the primary drive motor to output a drive torque to drive a vehicle, acting as a main power source of the four-mode dual-motor coupling electric drive axle;
- the auxiliary drive motor is a hollow-shaft outer-rotor permanent magnet synchronous motor; an inner stator of the auxiliary drive motor is fixed, and an outer housing rotor of the auxiliary drive motor is configured to output a torque; when the electric drive axle operates in a single-motor drive mode, the auxiliary drive motor does not participate in driving the vehicle; when the electric drive axle operates in a TV drive mode, the torque output by the auxiliary drive motor is configured to allow arbitrary distribution of the drive torque output by the primary drive motor between the first half shaft and the second half shaft of the power output mechanism; when the electric drive axle operates in a dual-motor torque coupling drive mode, the auxiliary drive motor is configured to output a torque to assist the primary drive motor to drive the vehicle; when the electric drive axle operates in a dual-motor speed coupling drive mode, the auxiliary drive motor acts as a speed control motor for the primary drive motor to regulate operating points of the primary drive motor; and the power generated by the auxiliary drive motor is output via the outer housing rotor;
- a main body of the reducer is a single-row single-planetary-gear planetary gear mechanism, and is configured for increasing and outputting a torque generated by the primary drive motor;
- the reducer comprises a first sun gear, a first planet gear, a first planet gear shaft, a first ring gear, and a first planet carrier; the first sun gear is connected to the output shaft of the primary drive motor; the first planet gear is engaged with the first sun gear; the first planet gear is rotatably supported on the first planet gear shaft; the first planet gear shaft is rotatably supported on the first planet carrier; and the first ring gear is fixed, and is engaged with the first planet gear;
- a main body of the TV coupler is a dual-row single-planetary-gear planetary gear mechanism consisting of two planetary gear sets having the same characteristic parameter; the TV coupler has three operating modes consisting of a disconnected mode, a TV mode, and a reducer mode; when operating in the disconnected mode, the TV coupler is configured to cut off power transmission of the auxiliary drive motor; when operating in the TV mode, the TV coupler is configured for torque vectoring; and when operating in the reducer mode, the TV coupler is configured to increase and output a torque output by the auxiliary drive motor;
- the TV coupler comprises a second planet gear, a second planet gear shaft, a second planet carrier, a second sun gear, a third sun gear, a third planet gear, a third planet gear shaft, a third planet carrier, a second ring gear, a first clutch, and a second clutch; the second planet gear is internally engaged with the outer housing rotor of the auxiliary drive motor; the second planet gear is rotatably supported on the second planet gear shaft; the second planet gear shaft is rotatably supported on the second planet carrier; the second sun gear is externally engaged with the second planet gear; the third planet gear is fixedly connected to the second sun gear; the third planet gear is externally engaged with the third sun gear; the third planet gear is rotatably supported on the third planet gear shaft; the third planet gear shaft is rotatably supported on the third planet carrier; the second ring gear is internally engaged with the third planet gear; an outer ring of the first clutch is fixedly connected to the second planet carrier; and an outer ring of the second clutch is fixedly connected to the second planet carrier, and an inner ring of the second clutch is fixedly connected to the third sun gear;
- the first clutch and the second clutch are both a wet multi-plate friction electromagnetic clutch;
- a main body of the power coupling differential is a double-row planetary gear mechanism, wherein a first planetary row is a single-planetary-gear planetary gear set, and a second planetary row is a double-planetary-gear planetary gear set having a characteristic parameter of 2; the power coupling differential has two operating modes consisting of a torque coupling mode and a speed coupling mode; when the power coupling differential operates in the torque coupling mode, the power coupling differential is configured to receive power output from the primary drive motor and the auxiliary drive motor, and output the power to the first half shaft and the second half shaft of the power output mechanism after torque coupling; when the power coupling differential operates in the speed coupling mode, the power coupling differential is configured to receive the power output from the primary drive motor and the auxiliary drive motor with the form of speed coupling, and then output the power to the first half shaft and the second half shaft;
- the power coupling differential comprises a differential end cover, a differential housing, a fourth sun gear, a fourth planet gear, a fourth planet gear shaft, a third ring gear, a fifth planet gear, a fifth planet gear shaft, a sixth planet gear, a sixth planet gear shaft, a fifth sun gear, a fourth planet carrier, and a third clutch; the differential end cover is screwedly connected to the differential housing; the differential end cover is fixedly connected to the first planet carrier; the fourth sun gear is fixedly connected to the third planet carrier; the fourth planet gear is externally engaged with the fourth sun gear; the fourth planet gear is rotatably supported on the fourth planet gear shaft; the fourth planet gear shaft is rotatably supported on the differential housing; the third ring gear is internally engaged with the fourth planet gear; the third ring gear is rotatably supported on the differential housing; the fifth planet gear is internally engaged with the third ring gear; the fifth planet gear is rotatably supported on the fifth planet gear shaft; the fifth planet gear shaft is rotatably supported on the fourth planet carrier; the sixth planet gear is externally engaged with the fifth planet gear; the sixth planet gear is rotatably supported on the sixth planet gear shaft; the sixth planet gear shaft is rotatably supported on the fourth planet carrier; the fifth sun gear is externally engaged with the sixth planet gear; an inner ring of the third clutch is fixedly connected to the fourth sun gear, and an outer ring of the third clutch is fixedly connected to the differential housing;

the third clutch is a wet multi-plate friction electromagnetic clutch;

the primary drive motor is arranged at one side of the power coupling differential, and the auxiliary drive motor is arranged at the other side of the power coupling differential; and the housing assembly is configured to accommodate components of the electric drive axle; the housing assembly comprises a first end cover, a first housing, a second end cover, and a second housing; the first end cover is screwedly connected to the first housing; the first housing is screwedly connected to the second housing; the second end cover is screwedly connected to the second housing;

the first ring gear is fixedly connected to the first housing; the second ring gear is fixedly connected to the second housing; one end of the power coupling differential is rotatably supported on the first housing through a first tapered roller bearing, and the other end of the power coupling differential is rotatably supported on the second housing through a second tapered roller bearing;

a control signal cable and a power supply cable of the first clutch successively pass through an axial gap between the first clutch and the auxiliary drive motor and a wiring hole of the second end cover to access the outside; and a control signal cable and a power supply cable of the second clutch successively pass through a radial gap between the second clutch and the second housing and a wiring hole of the second housing to access the outside; a control signal cable and a power cable of the third clutch successively pass through a radial gap between the third clutch and the second housing and a wiring hole of the second housing to access the outside;

the power output mechanism is configured to output power to wheels of the vehicle through a universal drive device; the power output mechanism comprises a first half shaft, a second half shaft, a first flange, and a second flange; one end of the first half shaft is in splined connection with the fifth sun gear, and the other end of the first half shaft is fixedly connected to the first flange; the first flange is axially fixed through a first flange nut; one end of the second half shaft is in splined connection with the fourth planet carrier, and the other end of the second half shaft is in splined connection with the second flange; the second flange is axially fixed through a second flange nut; and one end of the first half shaft is rotatably supported on the output shaft of the primary drive motor through a first needle roller bearing, and the other end of the first half shaft is rotatably supported on the first housing through a second needle roller bearing; a first rubber seal is provided between the first flange and the first end cover for sealing; one end of the second half shaft is rotatably supported on the fourth sun gear through a third needle roller bearing, and the other end of the second half shaft is rotatably supported on the second end cover through a fourth needle roller bearing; a second rubber seal is provided between the second flange and the second end cover for sealing; the inner ring of the first clutch is fixedly connected to the second half shaft; the second sun gear is rotatably supported on the first half shaft; and the third sun gear is rotatably supported on the first half shaft.

In some embodiments, the electric drive axle has four drive modes consisting of a single-motor drive mode, a TV drive mode, a dual-motor torque coupling drive mode, and a dual-motor speed coupling drive mode; the electric drive axle is configured to be switchable among the four drive modes by controlling operating modes of the TV coupler and the power coupling differential.

In some embodiments, the TV coupler has three operating modes, respectively a disconnected mode, a TV mode, and a reducer mode, and is switchable among the three operating modes by controlling operating states of the first clutch and the second clutch.

In some embodiments, when the first clutch and the second clutch are both in a disengaged state, the second planet carrier is disconnected from the second half shaft and the second sun gear, and at this time, the TV coupler is operating in the disconnected mode; when the first clutch is in an engaged state and the second clutch is in a disengaged state, the second planet carrier is connected to the second half shaft and disconnected from the second sun gear, and at this time, the TV coupler is operating in the TV mode; when the first clutch is in a disengaged state and the second clutch is in an engaged state, the second planet carrier is disconnected from the second half shaft and connected to the second sun gear, and at this time, the TV coupler is operating in the reducer mode.

In some embodiments, the power coupling differential is switchable between the torque coupled mode and the speed coupled mode by controlling operating states of the third clutch;

when the third clutch is in an engaged state, the differential housing is connected to the fourth sun gear, and at this time, the power coupling differential operates in the torque coupling mode; and when the third clutch is in a disengaged state, the differential housing is disconnected from the fourth sun gear, and at this time, the power coupling differential operates in the speed coupling mode.

In some embodiments, when the TV coupler is in the TV mode and the power coupling differential is in the torque coupling mode, the electric drive axle operates in the TV drive mode, and at this time, the vehicle is driven by the primary drive motor alone.

In some embodiments, when the four-mode dual-motor coupling electric drive axle operates in the single-motor drive mode, the power output of the primary drive motor is directly transmitted to the first half shaft and the second half shaft through the power coupling differential, wherein the auxiliary drive motor is not involved in the transmission; and at this time, a torque output from the first half shaft and the second half shaft is expressed as $T_{o1}=T_{o2}=\frac{1}{2}T_{i1}i$, wherein $T_{o1}$ represents a torque output from the first half shaft; $T_{o2}$ represents a torque output from the second half shaft; $T_{i1}$ represents a torque output from the primary drive motor; i represents a transmission ratio of the reducer; and $i=k_1+1$, wherein $k_1$ represents a characteristic constant of the planetary row of the reducer; and the relationship of rotation speeds of the output shaft of the primary drive motor, the first half shaft and the second half shaft is expressed as $$\frac{1}{i}n_{i1} = \frac{1}{2}(n_{o1} + n_{o2}),$$

wherein $n_{i1}$ represents a rotation speed of the output shaft of the primary drive motor; $n_{o1}$ represents a rotation speed of the first half shaft; and $n_{o2}$ represents a rotation speed of the second half shaft.

In some embodiments, when the TV coupler operates in the TV mode and the power coupled differential operates in the torque coupled mode, the four-mode dual-motor coupled electric drive axle operates in the TV drive mode, and at this time, the vehicle is driven by the primary drive motor alone and the power output by the auxiliary drive motor allows arbitrary distribution of the torque generated by the primary drive motor between the first half shaft and the second half shaft.

In some embodiments, when the four-mode dual-motor coupling electric drive axle operates in the torque vectoring drive mode, the power output from the primary drive motor is transmitted directly to the first half shaft and the second half shaft via the power coupling differential, and the power output from the auxiliary drive motor reduces the torque output from the first half shaft and increases the torque output from the second half shaft; at this time, the torque output from the first half shaft is expressed as $$T_{o1} = \frac{1}{2}T_{i1}i - \frac{k_2+1}{2k_2}T_{i2},$$

and the torque output from the second half shaft is expressed as $$T_{o2} = \frac{1}{2}T_{i1}i + \frac{k_2+1}{2k_2}T_{i2},$$

wherein $T_{i2}$ represents a torque output from the auxiliary drive motor, and $k_2$ represents a characteristic constant of the planetary row of the TV coupler; the relationship of rotation speeds among the output shaft of the primary drive motor, the outer housing rotor of the auxiliary drive motor, the first half shaft, and the second half shaft is expressed as $$\frac{1}{i}n_{i1} = \frac{1}{2}(n_{o1} + n_{o2}) \text{ and } n_{i2} = \frac{k_2+1}{2k_2}(n_{o2} - n_{o1}),$$

wherein $n_{i2}$ represents a rotation speed of the outer housing rotor 2001 of the auxiliary drive motor.

In some embodiments, when the four-mode dual-motor coupling electric drive operates in the TV drive mode, if the auxiliary drive motor outputs a positive torque, the additional transverse moment generated by the distributed torque increases the transverse yaw of the vehicle; and if the auxiliary drive motor outputs a negative torque, the additional transverse moment generated by the distributed torque reduces the transverse yaw of the vehicle.

In some embodiments, when the TV coupler operates in the reducer mode and the power coupling differential operates in the torque coupling mode, the four-mode dual-motor coupling electric drive axle operates in the dual-motor torque coupling drive mode, and at this time, the auxiliary drive motor participates in driving the vehicle as a booster motor for the primary drive motor.

In some embodiments, when the four-mode dual-motor coupling electric drive axle operates in the dual-motor torque coupling drive mode, the power output from the primary drive motor and the auxiliary drive motor is output to the first half shaft and the second half shaft after torque coupling by the power coupling differential, and at this time, the torque output from the first half shaft and the second half shaft is expressed as $T_{o1}=T_{o2}=\frac{1}{2}(T_{i1}i+T_{i2}(k_2+1))$; and the relationship among rotation speeds of the output shaft of the primary drive motor, the outer housing rotor of the auxiliary drive motor, the first half shaft, and the second half shaft is expressed as $$\frac{1}{i}n_{i1} = \frac{1}{k_2+1}n_{i2} = \frac{1}{2}(n_{o1} + n_{o2}).$$

In some embodiments, when the TV coupler operates in the reducer mode and the power coupling differential operates in the speed-coupling mode, the four-mode dual-motor coupling electric drive axle operates in the dual-motor speed-coupling drive mode, and at this time, the auxiliary drive motor participates in driving the vehicle as a speed-controlled motor for the primary drive motor.

In some embodiments, when the four-mode dual-motor coupling electric drive axle operates in the dual-motor speed-coupling drive mode, the power output from the primary drive motor and the auxiliary drive motor is output to the first half shaft and the second half shaft after speed coupling by the power-coupled differential, and at this time, the torque output from the first half shaft and the second half shaft is expressed as $$T_{o1} = T_{o2} = \frac{1}{2}T_{i1}i\frac{k_3}{k_3+1} = -\frac{1}{2}T_{i2}(k_2+1)k_3;$$

the relationship among rotation speeds of the output shaft of the primary drive motor, the outer housing rotor of the auxiliary drive motor, the first half shaft, and the second half shaft is expressed as $$\frac{k_3+1}{i}n_{i1} - \frac{1}{k_2+1}n_{i2} = \frac{1}{2}(n_{o1} + n_{o2})k_3.$$

Compared to the prior art, the present disclosure has the following beneficial effects.

(1) The four-mode dual-motor coupling electric drive axle described in this application effectively integrates the TV technology and the dual-motor coupling technology, improves the utilization rate of the auxiliary drive motor through mode switching, and simultaneously enables the TV and dual-motor coupling. In the TV drive mode, the drive axle achieves the arbitrary distribution of drive torque between the left and right wheels of the vehicle, avoiding power loss compared with the traditional electronic stability control system (ESP/VDC) which relies on differential braking, and effectively improving the dynamics performance, economic efficiency, handling stability and driving pleasure of the vehicle. When the drive axle operates in the torque coupling mode, the vehicle has better acceleration and climbing ability under the assistance of the auxiliary drive motor, and the power performance can be enhanced. When the drive axle operates in the speed coupling mode, the auxiliary drive motor regulates the speed of the primary drive motor to allow the primary drive motor to work more in the high efficiency range, effectively improving the overall drive efficiency and economy of the vehicle.

(2) The four-mode dual-motor coupling electric drive axle described herein integrates the primary drive motor, the auxiliary drive motor, the reducer, the TV coupler, and the power coupling differential, and can simultaneously realize the power output, transmission ratio regulation, and mode switching. The electric drive axle has high integration degree, compact structure, and small size, which can improve the space utilization of the chassis of the vehicle.

(3) The power disconnection of the auxiliary drive motor, torque vectoring, and speed reduction are enabled through the TV coupler, and the switching of the three functions can be achieved by controlling two electromagnetic clutches. The electric drive axle has high integration degree and modularity, and thus has a promising application prospect.

(4) The dual-motor torque coupling drive, dual-motor speed coupling drive, and differential speed are enabled through the power coupling differential, and the switching between the two coupling modes can be achieved by controlling an electromagnetic clutch. The electric drive axle has fewer actuating elements, leading to simplified structure and reliable control.

DETAILED DESCRIPTION OF EMBODIMENTS

The present disclosure will be further described below with reference to the embodiments and accompanying drawings to enable those skilled in the art to implement the technical solutions disclosed herein.

Figure 1:
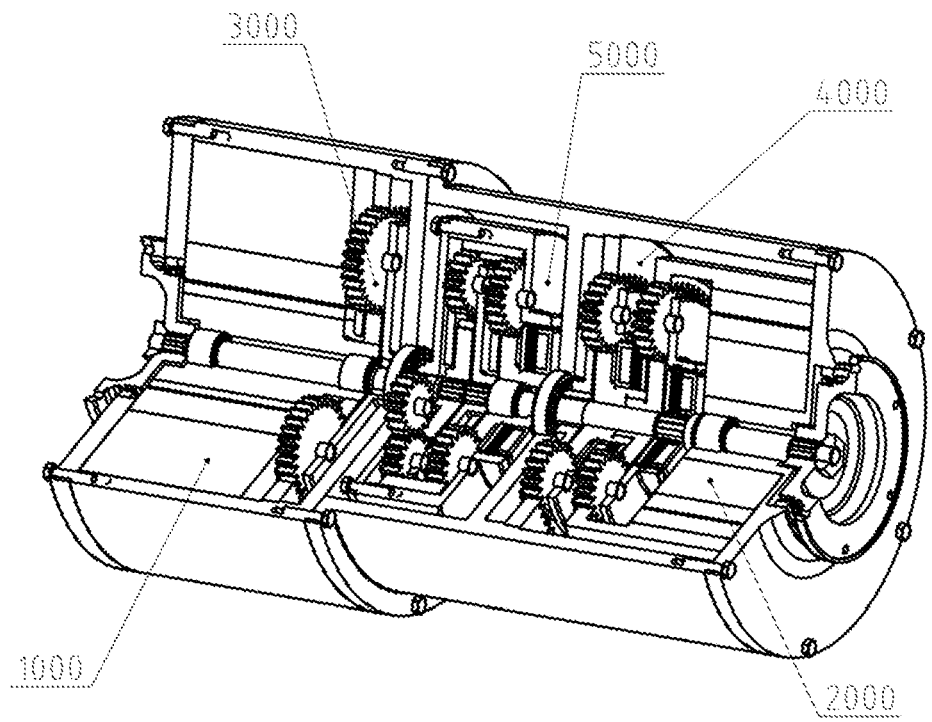
FIG. 1 is a perspective view of a four-mode dual-motor coupling electric drive axle according to an embodiment of the present disclosure.
Figure 2:
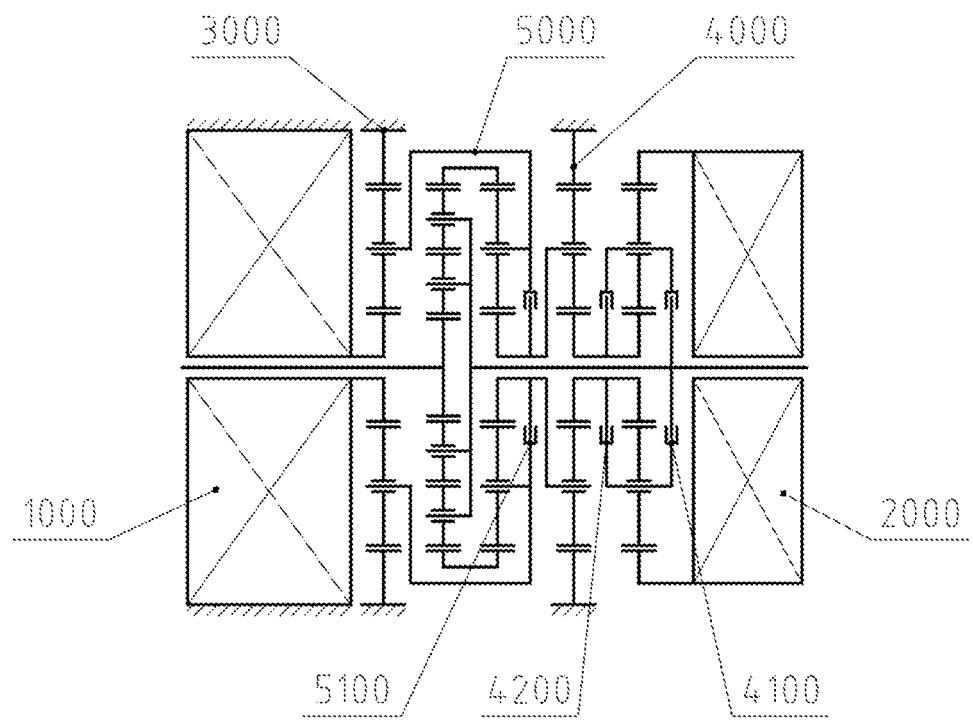
FIG. 2 schematically illustrates design principle of the four-mode dual-motor coupling electric drive axle according to an embodiment of the present disclosure.
Figure 3:
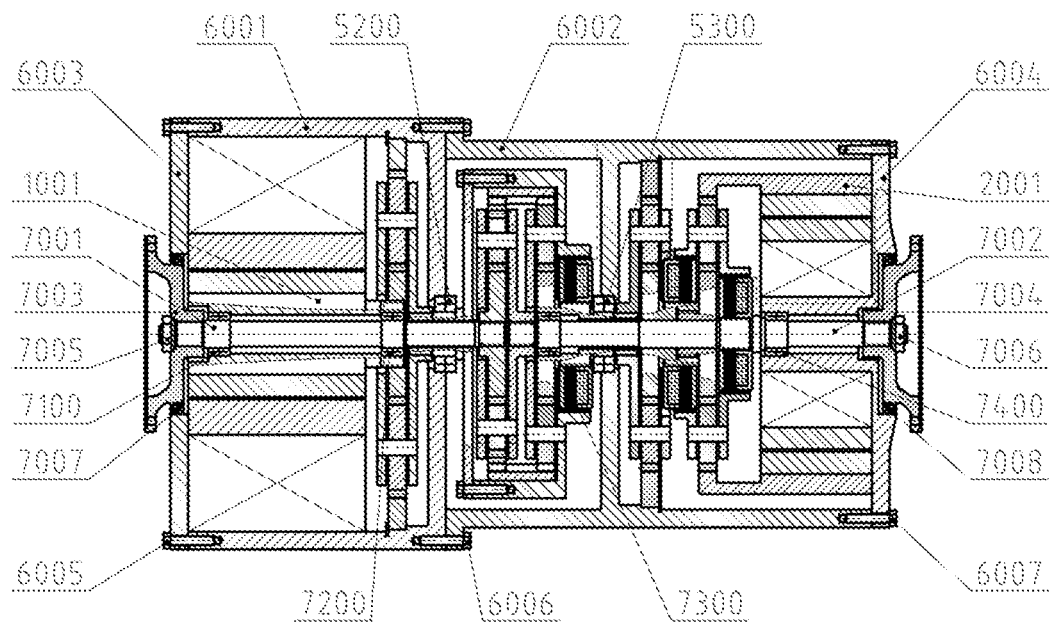
FIG. 3 is a structural section view of the four-mode dual-motor coupling electric drive axle according to an embodiment of the present disclosure.

An embodiment illustrated in FIGS. 1-3 provides a four-mode dual-motor coupling electric drive axle, which includes a primary drive motor 1000, an auxiliary drive motor 2000, a reducer 3000, a torque vectoring (TV) coupler 4000, a power coupling differential 5000, a housing assembly, and a power output mechanism. The primary drive motor 1000 is a hollow-shaft inner-rotor permanent magnet synchronous motor, which includes an outer stator and an inner rotor output shaft. The outer stator is fixedly connected to the housing assembly, and the inner rotor output shaft is configured to output a drive torque. The primary drive motor 1000 is arranged on a left side of the electric drive axle and is configured to output power via an output shaft 1001 of the primary drive motor. The auxiliary drive motor 2000 is a hollow-shaft outer-rotor permanent magnet synchronous motor, which includes an inner stator and an outer housing rotor. The inner stator is fixedly connected to the housing assembly, and the outer housing rotor is configured to output a torque. The auxiliary drive motor 2000 is arranged on a right side of the electric drive axle and is configured to output power via the outer housing rotor 2001 of the auxiliary drive motor. An end of the output shaft 1001 of the primary drive motor is machined with an external spline, and an inner side of an end of the outer housing rotor 2001 of the auxiliary drive motor is machined with an inner gear.

Figure 4:
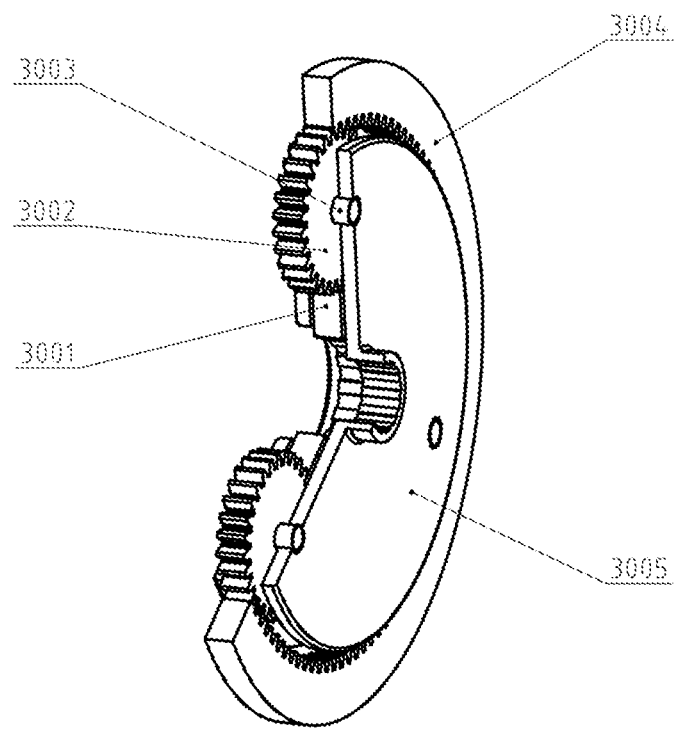
FIG. 4 is a perspective view of a reducer of the four-mode dual-motor coupling electric drive axle according to an embodiment of the present disclosure.

As shown in FIGS. 1 and 3-4, a main body of the reducer 3000 is a single-row single-planetary-gear planetary gear mechanism, including a first sun gear 3001, a first planet gear 3002, a first planet gear shaft 3003, a first ring gear 3004, and a first planet carrier 3005. An inner hole of the first sun gear 3001 is machined with an internal spline and is connected to the external spline of the output shaft 1001 of the primary drive motor. The first planet gear 3002 is engaged with the first sun gear 3001. The first planet gear 3002 is rotatably supported on the first planet gear shaft 3003. The first planet gear shaft 3003 is rotatably supported on the first planet carrier 3005. The first ring gear 3004 is fixedly connected to the housing and engaged with the first planet gear 3002.

It should be noted that the reducer 3000 can be composed of a variety of reducers, and different reducers can achieve the same function. Therefore, the replacement of the reducer 3000 is not considered as an innovation to the present disclosure.

Figure 5:
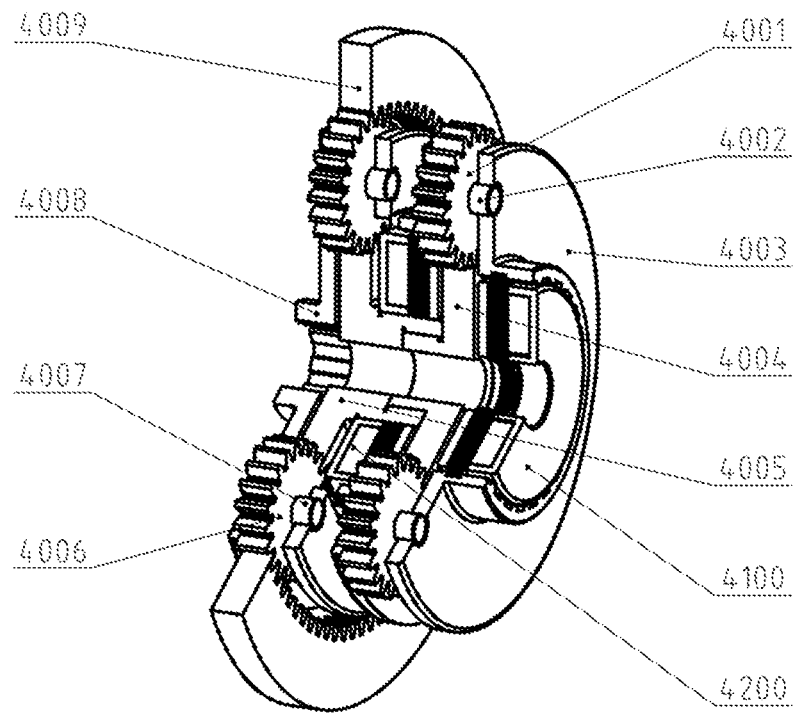
FIG. 5 is a perspective view of a torque vectoring (TV) coupler of the four-mode dual-motor coupling electric drive axle according to an embodiment of the present disclosure.

As shown in FIGS. 1, 3, and 5, the main body of the TV coupler 4000 is a dual-row planetary gear mechanism consisting of two planetary gear sets having the same characteristic parameter. Each planetary gear set includes a second planet gear 4001, a second planet gear shaft 4002, a second planet carrier 4003, a second sun gear 4004, a third sun gear 4005, a third planet gear 4006, a third planet gear shaft 4007, a third planet carrier 4008, a second ring gear 4009, a first clutch 4100, and a second clutch 4200. The second planet gear 4001 is internally engaged with the outer housing rotor 2001 of the auxiliary drive motor. The second planet gear 4001 is rotatably supported on the second planet gear shaft 4002. The second planet gear shaft 4002 is rotatably supported on the second planet carrier 4003. The second sun gear 4004 is externally engaged with the second planet gear 4001. An outer side of an end of the second sun gear 4004 is machined with an outer spline. The third sun gear 4005 is machined with an inner spline on an inner hole and an outer spline on an outer side at an end of the third sun gear 4005. The third sun gear 4005 is splined to the second sun gear 4004. The third planet gear 4006 is externally engaged with the third sun gear 4005. The third planet gear 4006 is rotatably supported on the third planet gear shaft 4007. The third planet gear shaft 4007 is rotatably supported on the third planet carrier 4008. The inner hole on one side of the third planet carrier 4008 is machined with an internal spline. The second ring gear 4009 is internally engaged with the third planet gear 4006. The first clutch 4100 is a wet multi-plate friction electromagnetic clutch with an outer ring splined to the second planet carrier 4003. The second clutch 4200 is a wet multi-plate friction electromagnetic clutch with an inner ring splined to the third sun gear 4005 and an outer ring splined to the third planet carrier 4008.

It should be noted that any change in the type or engagement of the first clutch 4100 and the second clutch 4200 is not considered as an innovation to the present invention.

Figure 6:
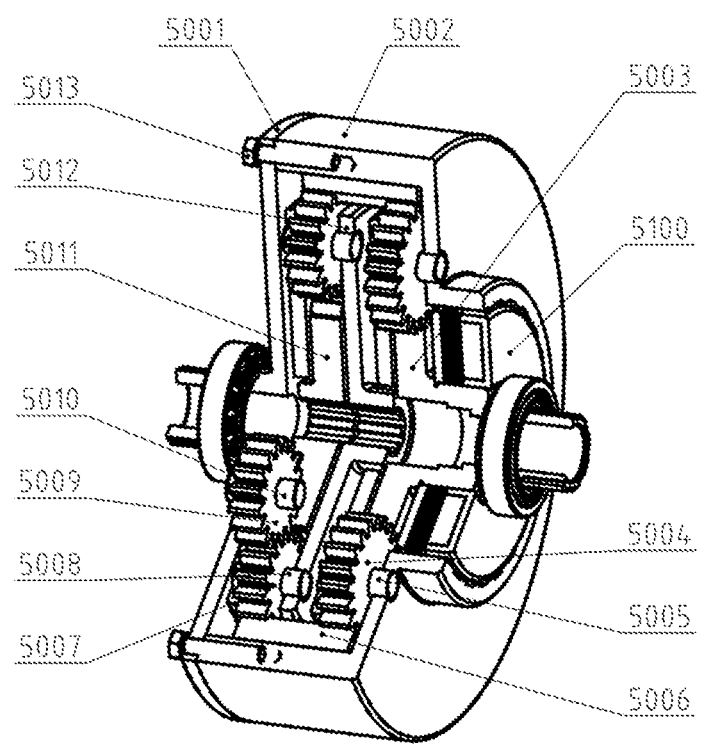
FIG. 6 is a perspective view of a power coupling differential of the four-mode dual-motor coupling electric drive axle according to an embodiment of the present disclosure.

As shown in FIGS. 1, 3, and 6, the main body of the power coupling differential 5000 is a dual-row planetary gear mechanism, a first planetary row of the dual-row planetary gear mechanism is a single planetary gear set, and a second planetary row of the dual-row planetary gear mechanism is a double planetary gear set having a characteristic parameter of 2. The power coupling differential 5000 includes a differential end cover 5001, a differential housing 5002, a fourth sun gear 5003, a fourth planet gear 5004, a fourth planet gear shaft 5005, a third ring gear 5006, a fifth planet gear 5007, a fifth planet gear shaft 5008, a sixth planet gear 5009, a sixth planet gear shaft 5010, a fifth sun gear 5011, a fourth planet carrier 5012, and a third clutch 5100. The differential end cover 5001 is fixedly connected to the differential housing 5002 through differential housing screws 5013. An outer side of one end of the fourth sun gear 5003 is provided with two outer splines. The fourth sun gear 5003 is in splined connection with the third planet carrier 4008. The fourth planet gear 5004 is externally engaged with the fourth sun gear 5003. The fourth planet gear 5004 is rotatably supported on the fourth planet gear shaft 5005. The fourth planet gear shaft 5005 is rotatably supported on the differential housing 5002. The third ring gear 5006 is rotatably supported on the differential housing 5002, and is internally engaged with the fourth planet gear 5004. The fifth planet gear 5007 is internally engaged with the third ring gear 5006. The fifth planet gear 5007 is rotatably supported on the fifth planet gear shaft 5008. The sixth planet gear 5009 is externally engaged with the fifth planet gear 5007. The sixth planet gear 5009 is rotatably supported on the sixth planet gear shaft 5010. The fifth planet gear shaft 5008 and the sixth planet gear shaft 5010 are rotatably supported on the fourth planet carrier 5012. The inner hole on one side of the fourth planet carrier 5012 is provided with an internal spline. The fifth sun gear 5011 is externally engaged with the sixth planet gear 5009, and the inner hole of the fifth sun gear 5011 is machined with an internal spline. The third clutch 5100 is a wet multi-plate friction electromagnetic clutch with an inner ring splined to the third sun gear 5003 and an outer ring splined to the differential housing 5002.

It is to be noted that any change in the type or engagement of the third clutch 5100 is not considered an innovation to the present disclosure.

As shown in FIGS. 1 and 3, the housing assembly includes a first housing 6001, a second housing 6002, a first end cover 6003, and a second end cover 6004. The first end cover 6003 is fixedly connected to the first housing 6001 through a first housing screw 6005. The first housing 6001 is fixedly connected to the second housing 6002 through a second housing screw 6006. The second end cover 6004 is fixedly connected to the second housing 6002 through a third housing screw 6007. One end of the power coupling differential 5000 is rotatably supported on the first housing 6001 through a tapered roller bearing 5200, and the other end of the power coupling differential 5000 is rotatably supported on the second housing 6002 through a tapered roller bearing 5300. The first ring gear 3004 is in interference connection with the first housing 6001. The second ring gear 4009 is in interference connection with the second housing 6002.

As shown in FIGS. 1 and 3, the power output mechanism includes a first half shaft 7001, a second half shaft 7002, a first flange 7003, and a second flange 7004. Two ends of both the first half shaft 7001 and the second half shaft 7002 are machined with external splines. The inner holes of both the first flange 7003 and the second flange 7004 are machined with internal splines. One end of the first half shaft 7001 is splined to the fifth sun gear 5011, and the other end of the first half shaft 7001 is splined to the first flange 7003. The first flange 7003 is axially fixed through a first flange nut 7005. One end of the second half shaft 7002 is splined to the fourth planet carrier 5012, and the other end of the second half shaft 7002 is splined to the second flange 7004. The second flange 7004 is axially fixed through a second flange nut 7006. The first half shaft 7001 is rotatably supported on the output shaft 1001 of the primary drive motor through a needle roller bearing 7100 and a needle roller bearing 7200. One end of the second half shaft 7002 is rotatably supported on the fourth sun gear 5003 by a needle roller bearing 7300, and the other end of the second half shaft 7002 is rotatably supported on the second end cover 6004 by a needle roller bearing 7400. A first rubber seal 7007 is provided between the first flange 7003 and the first end cover 6003 for sealing. A second rubber seal 7008 is provided between the second flange 7004 and the second end cover 6004 for sealing. The inner ring of the first clutch 4100 is fixedly connected to the second half shaft 7002. The first sun gear 4004 is rotatably supported on the first half shaft 7001. The second sun gear 4005 is rotatably supported on the first half shaft 7001.

Figure 7:
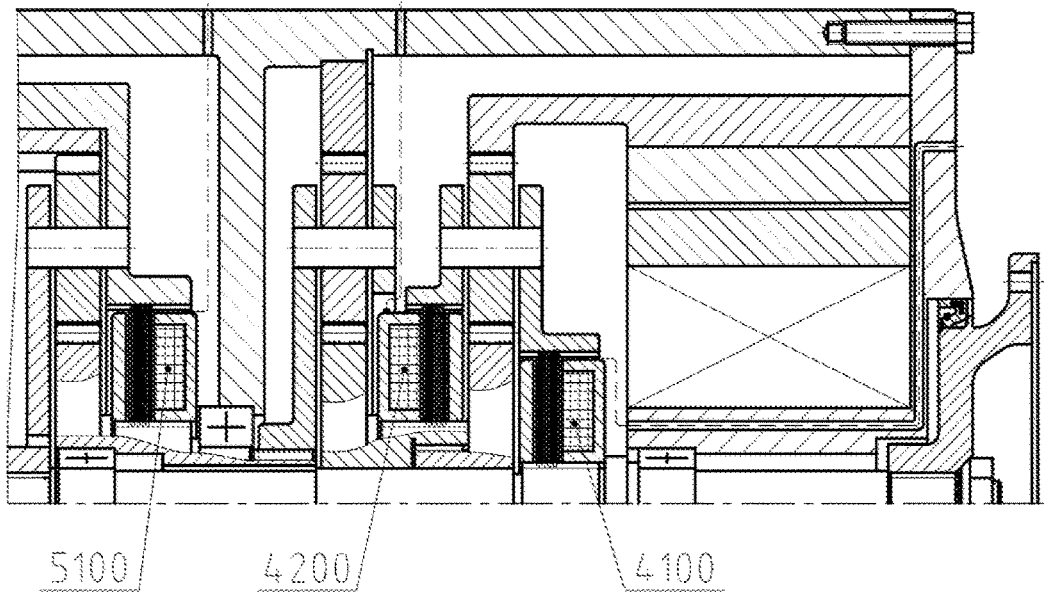
FIG. 7 schematically shows wiring arrangement of clutches of the four-mode dual-motor coupling electric drive axle according to an embodiment of the present disclosure.

As shown in FIG. 7, a control signal cable and power cable of the first clutch 4100 successively pass through an axial gap between the first clutch 4100 and the auxiliary drive motor 2000 and a wiring hole of the second end cover 6004 to access the outside. A control signal cable and power cable of the second clutch 4200 successively pass through a radial gap between the second clutch 4200 and the second housing 6002 and a wiring hole of the second housing 6002 to access the outside. A control signal cable and power cable of the third clutch 5100 successively pass through a radial gap between the third clutch 5100 and the second housing 6002 and a wiring hole of the second housing 6002 to access the outside.

The operating modes of a four-mode dual-motor coupling electric drive axle provided herein will be further described in detail with reference to the accompanying drawings.

As shown in Table 1, the four-mode dual-motor coupling electric drive axle provided herein has four drive modes, namely, a single-motor drive mode, a TV drive mode, a dual-motor torque coupling drive mode, and a dual-motor speed coupling drive mode. The electric drive axle is switchable among the four operating modes by controlling operating modes of the TV coupler 4000 and the power coupling differential 5000. The TV coupler 4000 has three operating modes, namely, a disconnected mode, a TV mode, and a reducer mode, and is switchable among the three operating modes by controlling operating states of the first clutch 4100 and the second clutch 4200. The power coupling differential 5000 has two operating modes, namely, a torque coupling mode and a speed coupling mode, and is switchable between the two operating modes by controlling operating states of the third clutch 5100. When the electric drive axle operates in the single-motor drive mode, the TV coupler 4000 is in the disconnected mode, and the first clutch 4100 and the second clutch 4200 are disconnected; and the power coupling differential is in the torque coupling mode, and the third clutch 5100 is engaged. When the electric drive axle operates in the TV drive mode, the TV coupler 4000 is in the TV mode, the first clutch 4100 is engaged, and the second clutch 4200 is disconnected; and the power coupling differential 5000 is in torque coupling mode, and the third clutch 5100 is engaged. When the electric drive axle operates in the dual-motor torque coupling drive mode, the TV coupler 4000 is in the reducer mode, the first clutch 4100 is disengaged, and the second clutch 4200 is engaged; and the power coupling differential 5000 is in the torque coupling mode, and the third clutch 5100 is engaged. When the electric drive axle operates in the dual-motor speed coupling drive mode, the TV coupler 4000 is in the reducer mode, the first clutch 4100 is disconnected, and the second clutch 4200 is engaged; and the power coupling differential 5000 is in the speed coupling mode, and the third clutch 5100 is disconnected.

TABLE 1

Correspondence table between the four operating modes of the four-mode dual-motor coupling electric drive axle, the operating state of the three clutches and the operating mode of the relevant assembly

| Operating modes of the electric drive axle | TV coupler 4000 | | | Power coupling differential 5000 | |
|---|---|---|---|---|---|
| | Operating states | First clutch 4100 | Second clutch 4200 | Operating modes | Third clutch 5100 |
| Single-motor drive mode | Disconnected mode | Disconnected | Disconnected | Torque coupling mode | Engaged |
| TV drive mode | TV mode | Engaged | Disconnected | | |
| Dual-motor torque coupling drive mode | Reducer mode | Disconnected | Engaged | | |
| Dual-motor speed coupling drive mode | | | | Speed coupling mode | Disconnected |

Figure 8:
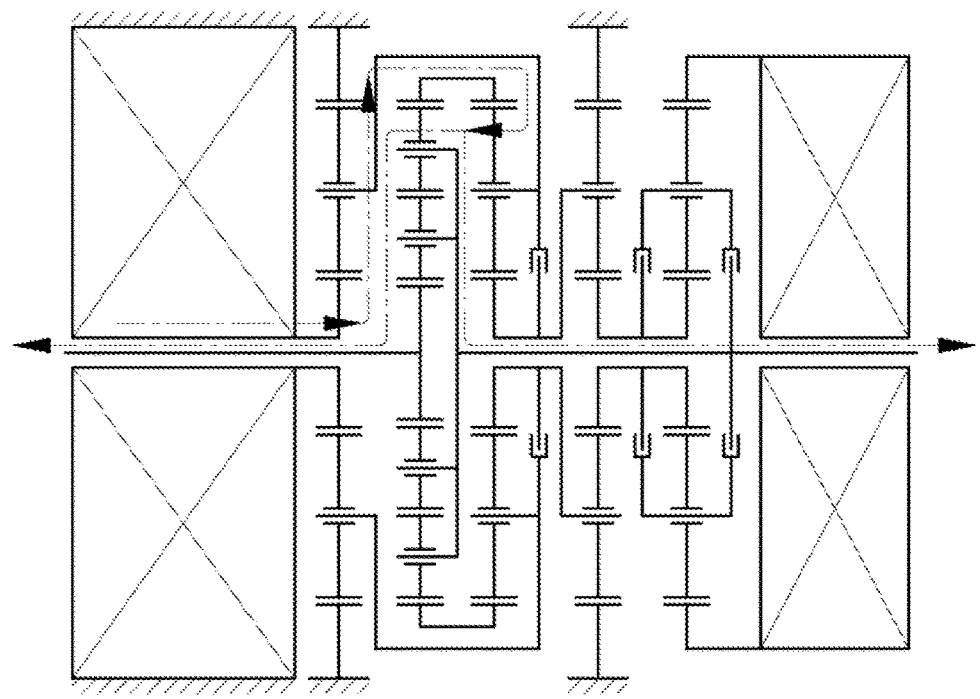
FIG. 8 schematically shows a torque flow of the four-mode dual-motor coupling electric drive axle under a single-motor drive mode according to an embodiment of the present disclosure.

As shown in FIG. 8, when the four-mode dual-motor coupling electric drive axle provided herein operates in the single-motor drive mode, the power output of the primary drive motor 1000 is directly transmitted to the first half shaft 7001 and the second half shaft 7002 through the power coupling differential 5000, where the auxiliary drive motor 2000 is not involved in the transmission. At this time, a torque output from the first half shaft 7001 and the second half shaft 7002 is expressed as $T_{o1}=T_{o2}=\frac{1}{2}T_{i1}i$, where $T_{o1}$ represents a torque output from the first half shaft 7001, $T_{o2}$ represents a torque output from the second half shaft 7002, $T_{i1}$ represents a torque output from the primary drive motor 1000, i represents a transmission ratio of the reducer 3000, and $i=k_1+1$, where $k_1$ represents a characteristic constant of the planetary row of the reducer 3000. The relationship of rotation speeds of the output shaft 1001 of the primary drive motor, the first half shaft 7001 and the second half shaft 7002 is expressed as $$\frac{1}{i}n_{i1} = \frac{1}{2}(n_{o1} + n_{o2}),$$

where $n_{i1}$ represents a rotation speed of the output shaft 1001 of the primary drive motor, $n_{o1}$ represents a rotation speed of the first half shaft 7001, and $n_{o2}$ represents a rotation speed of the second half shaft 7002.

Under the single-motor drive mode, the primary drive motor 1000, as the only power source, has a higher load rate under the driving conditions of low power demand of the vehicle, and thus can work in the high efficiency range as much as possible. At this time, the whole vehicle is driven more efficiently and thus has good economic efficiency.

Figure 9:
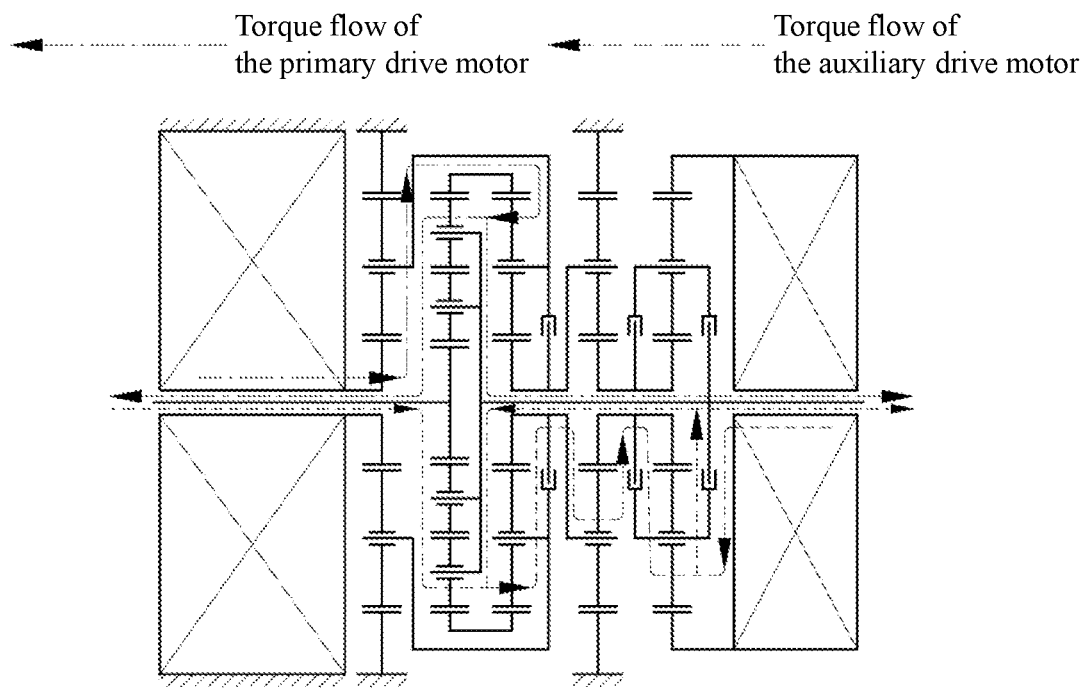
FIG. 9 schematically shows a torque flow of the four-mode dual-motor coupling electric drive axle under a TV drive mode according to an embodiment of the present disclosure.

As shown in FIG. 9, when the four-mode dual-motor coupling electric drive axle provided herein operates in the TV drive mode, the power output from the primary drive motor 1000 is transmitted directly to the first half shaft 7001 and the second half shaft 7002 via the power coupling differential 5000, and the power output from the auxiliary drive motor 2000 reduces the torque output from the first half shaft 7001 and increases the torque output from the second half shaft 7002. At this time, the torque output from the first half shaft 7001 is expressed as $$T_{o1} = \frac{1}{2}T_{i1}i - \frac{k_2+1}{2k_2}T_{i2},$$

and the torque output from the second half shaft 7002 is expressed as $$T_{o2} = \frac{1}{2}T_{i1}i + \frac{k_2+1}{2k_2}T_{i2},$$

where $T_{i2}$ represents a torque output from the auxiliary drive motor 2000, and $k_2$ represents a characteristic constant of the planetary row of the TV coupler 4000. The relationship of rotation speeds among the output shaft 1001 of the primary drive motor, the outer housing rotor 2001 of the auxiliary drive motor, the first half shaft 7001, and the second half shaft 7002 is expressed as $$\frac{1}{i}n_{i1} = \frac{1}{2}(n_{o1} + n_{o2}) \text{ and } n_{i2} = \frac{k_2+1}{2k_2}(n_{o2} - n_{o1}),$$

where $n_{i2}$ represents a rotation speed of the outer housing rotor 2001 of the auxiliary drive motor.

Figure 10:
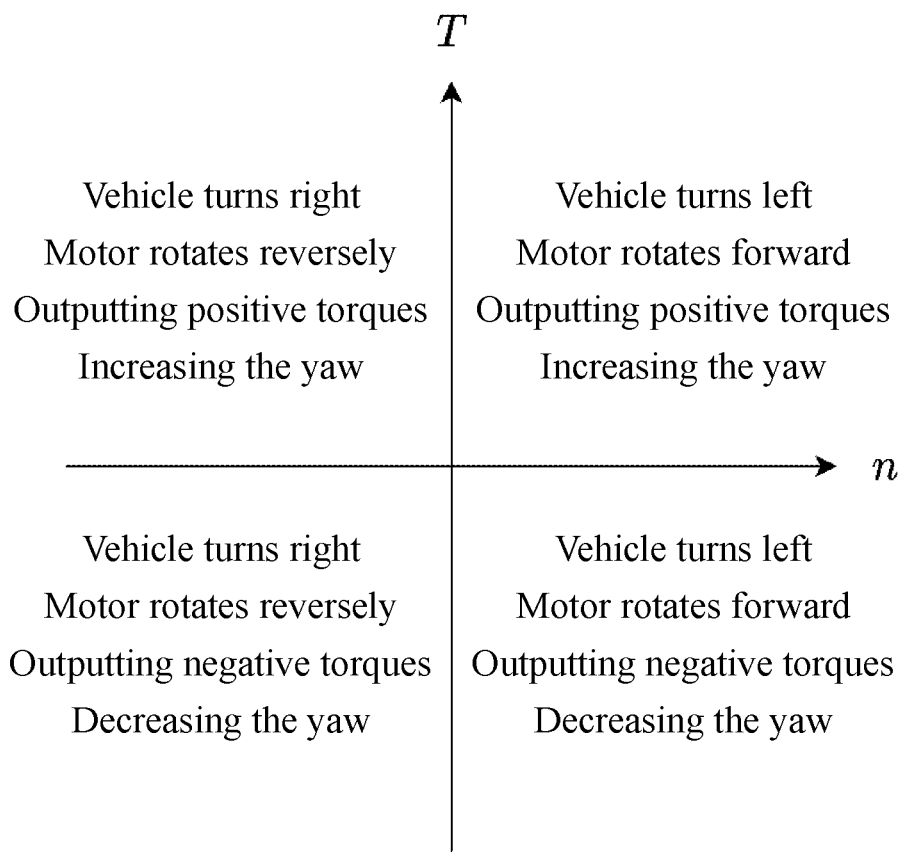
FIG. 10 shows an operation quadrant diagram of an auxiliary drive motor of the four-mode dual-motor coupling electric drive axle under the TV drive mode according to an embodiment of the present disclosure.

The effects of the torque vectoring under the TV drive mode are further explained below with reference to FIG. 10.

Embodiment 1

When the vehicle turns left, the rotation speed of the first half shaft 7001 is less than that of the second half shaft 7002, and the auxiliary drive motor 2000 rotates positively. At this time, if the auxiliary drive motor 2000 outputs a positive torque, the torque output from the first half shaft 7001 will be smaller than the torque output from the second half shaft 7002, making the driving force of the left wheel of the vehicle smaller than the driving force of the right wheel of the vehicle, thus generating an additional transverse torque whose direction is the same as the direction of the angular velocity of the yaw of the vehicle, thereby increasing the yaw of the vehicle. If the auxiliary drive motor 2000 outputs a negative torque, the torque output from the first half shaft 7001 will be greater than the torque output from the second half shaft 7002, making the driving force of the left wheel of the vehicle greater than the driving force of the right wheel of the vehicle, thus generating an additional transverse torque whose direction is opposite to the direction of the angular velocity of the yaw of the vehicle, thereby reducing the yaw of the vehicle.

When the vehicle turns right, the rotation speed of the first half shaft 7001 is greater than that of the second half shaft 7002, and the auxiliary drive motor 2000 rotates reversely. At this time, if the auxiliary drive motor 2000 outputs a positive torque, the torque output from the first half shaft 7001 will be greater than the torque output from the second half shaft 7002, making the driving force of the left wheel of the vehicle greater than the driving force of the right wheel of the vehicle, thus generating an additional transverse torque whose direction is the same as the direction of the transverse angular velocity of the vehicle, thereby increasing the yaw of the vehicle. If the auxiliary drive motor 2000 outputs a negative torque, the torque output from the first half shaft 7001 will be less than the torque output from the second half shaft 7002, making the driving force of the left wheel of the vehicle less than the driving force of the right wheel of the vehicle, thus generating an additional transverse moment whose direction is opposite to the direction of the transverse angular velocity of the vehicle, thereby reducing the transverse moment of the car.

In this scenario, when the yaw of the vehicle is increased by the torque output from the auxiliary drive motor 2000, the cornering maneuverability and steering maneuverability of the vehicle can be enhanced. When the yaw of the vehicle is reduced by the torque outputted from the auxiliary drive motor 2000, the steering stability can be ensured, thereby improving the active safety of the vehicle.

Embodiment 2

When a left wheel of a vehicle is stuck in a mud puddle or the wheels skid when driving on a low adhesion road surface, such as ice or snow, the rotation speed of the first half shaft 7001 is greater than that of the second half shaft 7002, and the auxiliary drive motor 2000 rotates positively. At this time, if the auxiliary drive motor 2000 outputs a positive torque, the torque output from the second half shaft 7002 is increased and the torque output from the first half shaft 7001 is reduced, which will increase the drive force of the right wheel of the vehicle while reduce the drive force of the left wheel of the vehicle, and thus restoring the drive force of the vehicle to extricate. When the right wheel of the vehicle is stuck in a mud puddle or when the wheels skid when driving on low adhesion roads, such as snow and ice, the rotation speed of the second half shaft 7002 is greater than that of the first half shaft 7001, and the auxiliary drive motor 2000 rotates reversely. At this time, if the auxiliary drive motor 2000 outputs a positive torque, the torque output from the first half shaft 7001 is increased and the torque output from the second half shaft 7002 is reduced, which will increase the driving force of the left wheel and reduce the driving force of the right wheel of the vehicle, thus restoring the driving force of the vehicle to extricate.

In this scenario, the torque vectoring can significantly improve the trafficability of the vehicle.

Figure 11:
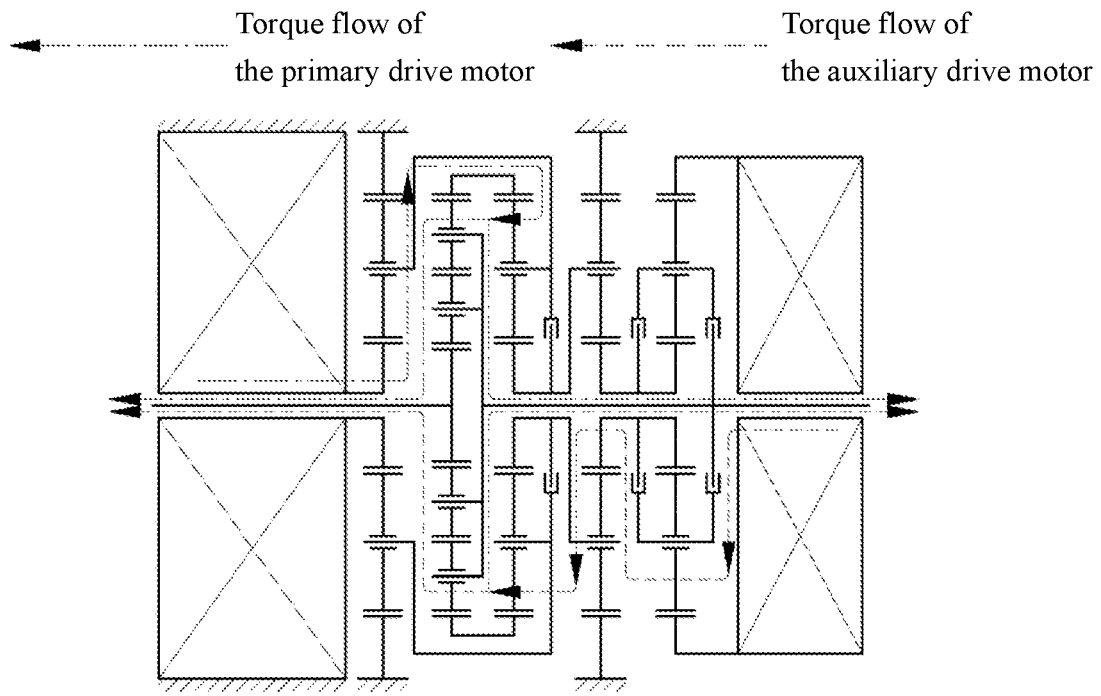
FIG. 11 schematically shows a torque flow of the four-mode dual-motor coupling electric drive axle under a dual-motor torque coupling drive mode according to an embodiment of the present disclosure.

As shown in FIG. 11, when the four-mode dual-motor coupling electric drive axle provided herein operates in the dual-motor torque coupling drive mode, the power output from the primary drive motor 1000 and the auxiliary drive motor 2000 is output to the first half shaft 7001 and the second half shaft 7002 after torque coupling by the power coupling differential 5000. At this time, the torque output from the first half shaft 7001 and the second half shaft 7002 is expressed as $T_{o1}=T_{o2}=\frac{1}{2}(T_{i1}i+T_{i2}(k_2+1))$. The relationship among rotation speeds of the output shaft 1001 of the primary drive motor, the outer housing rotor 2001 of the auxiliary drive motor, the first half shaft 7001, and the second half shaft 7002 is expressed as $$\frac{1}{i}n_{i1} = \frac{1}{k_2+1}n_{i2} = \frac{1}{2}(n_{o1} + n_{o2}).$$

In the dual-motor torque coupling drive mode, the power output from the primary drive motor 1000 is coupled with the power torque output from the auxiliary drive motor 2000 to drive the vehicle. In this case, the vehicle has better acceleration and hill climbing ability, better dynamics, and can meet the driving conditions requiring high power. In addition, through the reasonable matching of the primary drive motor 1000 and the auxiliary drive motor 2000, the power output from the auxiliary drive motor 2000 can cut the peaks and fill the valleys of the power outputted from the primary drive motor 1000, that is, replenish the insufficient power and absorb the excess power output from the primary drive motor 1000, which can reduce the fluctuation of the power output from the primary drive motor 1000 and enable the primary drive motor 1000 to operate in the high-efficiency range as much as possible, and thus maximizing the drive efficiency of the vehicle and improving its economy.

Figure 12:
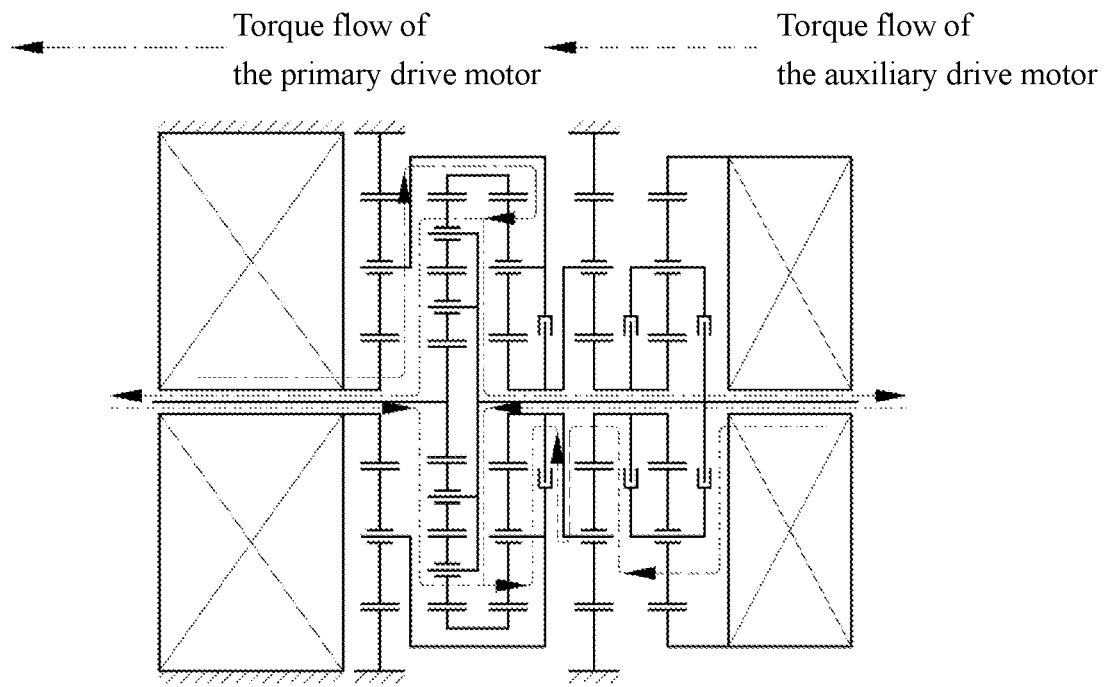
FIG. 12 schematically shows a torque flow of the four-mode dual-motor coupling electric drive axle under a dual-motor speed coupling drive mode according to an embodiment of the present disclosure.

As shown in FIG. 12, when the four-mode dual-motor coupled electric drive axle provided herein operates in the dual-motor speed-coupled drive mode, the power output from the primary drive motor 1000 and the auxiliary drive motor 2000 is output to the first half shaft 7001 and the second half shaft 7002 after speed coupling by the power-coupled differential 5000. At this time, the torque output from the first half shaft 7001 and the second half shaft 7002 is expressed as $$T_{o1} = T_{o2} = \frac{1}{2} T_{i1} i \frac{k_3}{k_3 + 1} = -\frac{1}{2} T_{i2}(k_2 + 1)k_3.$$

The relationship among rotation speeds of the output shaft 1001 of the primary drive motor, the outer housing rotor 2001 of the auxiliary drive motor, the first half shaft 7001, and the second half shaft 7002 is expressed as $$\frac{k_3 + 1}{i} n_{i1} - \frac{1}{k_2 + 1} n_{i2} = \frac{1}{2}(n_{o1} + n_{o2})k_3.$$

In the dual-motor speed coupling drive mode, the power output from the main drive motor 1000 is coupled to the power outputted from the auxiliary drive motor 2000. In this case, the auxiliary drive motor 2000 works mainly in the power generation mode, acting as a speed control motor, which enables the primary drive motor to work in the high-efficiency range as much as possible and prevents it from entering the weak magnetic inefficiency range, maintaining a high drive efficiency of the vehicle. In addition, the auxiliary drive motor 2000 can also act as a stepless speed regulator, realizing electronic stepless speed change, so as to realize continuous change of vehicle speed while the operating point of the primary drive motor 1000 remains in the high-efficiency range, so that the vehicle has high economy when driving at high speeds.

The embodiments disclosed above are merely illustrative of the disclosure, and are not intended to limit the present disclosure. It should be understood that any modifications, changes and replacements made by those skilled in the art without departing from the spirit of the disclosure shall fall within the scope of the disclosure defined by the appended claims.

What is claimed is:

1. An electric drive axle, comprising:
a primary drive motor;
an auxiliary drive motor;
a reducer;
a torque vectoring (TV) coupler;
a power coupling differential;
a housing assembly; and
a power output mechanism;
wherein the primary drive motor is configured as a main power source for driving a vehicle;
the auxiliary drive motor is configured as a TV power source or an auxiliary power source for driving the vehicle;
the reducer is a single-row single-planetary-gear planetary gear mechanism, and is configured for increasing and outputting a torque generated by the primary drive motor;
the TV coupler has three operating modes consisting of a disconnected mode, a TV mode, and a reducer mode; when operating in the disconnected mode, the TV coupler is configured to cut off power transmission of the auxiliary drive motor; when operating in the TV mode, the TV coupler is configured for torque vectoring; and when operating in the reducer mode, the TV coupler is configured to increase and output a torque output from the auxiliary drive motor;
the power output mechanism comprises a first half shaft, a second half shaft, a first flange, and a second flange; and the power output mechanism is configured to output power to wheels of the vehicle;
the power coupling differential has two operating modes consisting of a torque coupling mode and a speed coupling mode; when operating in the torque coupling mode, the power coupling differential is configured to receive power output from the primary drive motor and the auxiliary drive motor, and output the power to the first half shaft and the second half shaft after torque coupling; and when in the speed coupling mode, the power coupling differential is configured to receive the power output from the primary drive motor and the auxiliary drive motor, and output the first half shaft and the second half shaft after speed coupling;
the housing assembly comprises a first end cover, a first housing, a second end cover, and a second housing, and is configured to accommodate the primary drive motor, the auxiliary drive motor, the reducer, the torque vectoring (TV) coupler, the power coupling differential and the power output mechanism;
the electric drive axle has four drive modes consisting of a single-motor drive mode, a TV drive mode, a dual-motor torque coupling drive mode, and a dual-motor speed coupling drive mode; the electric drive axle is configured to be switchable among the four drive modes by controlling operating modes of the TV coupler and the power coupling differential;
when the TV coupler is in the disconnected mode and the power coupling differential is in the torque coupling mode, the electric drive axle operates in the single-motor drive mode, and at this time, the vehicle is driven by the primary drive motor alone, with the driving torque equally distributed between the first half shaft and the second half shaft;
when the TV coupler is in the TV mode and the power coupling differential is in the torque coupling mode, the electric drive axle operates in the TV drive mode, and at this time, the vehicle is driven by the primary drive motor alone, and the power output from the auxiliary drive motor is configured to allow arbitrary distribution of the torque generated by the primary drive motor between the first half shaft and the second half shaft;
when the TV coupler is in the reducer mode and the power coupling differential is in the torque coupling mode, the electric drive axle operates in the dual-motor torque coupling drive mode, and at this time, the auxiliary drive motor is configured to assist the primary drive motor to drive the vehicle together; and
when the TV coupler is in the reducer mode and the power coupling differential is in the speed coupling mode, the electric drive axle operates in the dual-motor speed coupling mode, and at this time, the auxiliary drive motor is configured as a speed control motor of the primary drive motor to participate in driving the vehicle.

2. The electric drive axle of claim 1, wherein a main body of the TV coupler is a dual-row single-planetary-gear planetary gear mechanism consisting of two planetary gear sets; and the main body of the TV coupler comprises a first planet gear, a first planet gear shaft, a first planet carrier, a first sun gear, a second sun gear, a second planet gear, a second planet gear shaft, a second planet carrier, a ring gear, a first clutch, and a second clutch; the ring gear is fixedly connected to the second housing; the first planet gear is internally engaged with an outer housing rotor of the auxiliary drive motor; the TV coupler is connected to the second half shaft through the first clutch; the second planet carrier is connected to the power coupling differential; the second sun gear is fixedly connected to the first sun gear; and the second clutch is arranged between the first planet carrier and the second sun gear.

3. The electric drive axle of claim 2, wherein the first clutch and the second clutch are configured to be controlled to enable switching of the TV coupler among the disconnected mode, the TV mode, and the reducer mode;
　　when the first clutch and the second clutch are both in a disengaged state, the first planet carrier is disconnected from the second half shaft and the first sun gear, and at this time, the TV coupler operates in the disconnected mode;
　　when the first clutch is in an engaged state and the second clutch is a disengaged state, the first planet carrier is connected to the second half shaft, and is disconnected from the first sun gear, and at this time, the TV coupler operates in the TV mode; and
　　when the first clutch is in a disengaged state and the second clutch is in an engaged state, the first planet carrier is disconnected from the second half shaft, and is connected to the first sun gear, and at this time, the TV coupler operates in the reducer mode.

4. The electric drive axle of claim 2, wherein a control signal cable and a power supply cable of the first clutch successively pass through an axial gap between the first clutch and the auxiliary drive motor and a wiring hole of the second end cover to access outside; and a control signal cable and a power supply cable of the second clutch successively pass through a radial gap between the second clutch and the second housing and a wiring hole of the second housing to access the outside.

5. The electric drive axle of claim 1, wherein a main body of the power coupling differential is a dual-row planetary gear mechanism; a first planetary row of the dual-row planetary gear mechanism is a single planetary gear set, and a second planetary row of the dual-row planetary gear mechanism is a double planetary gear set; the main body of the power coupling differential comprises a differential end cover, a differential housing, a first sun gear, a first planet gear, a first planet gear shaft, a ring gear, a second planet gear, a second planet gear shaft, a third planet gear, a third planet gear shaft, a second sun gear, a planet carrier, and a clutch; the second sun gear is in splined connection with the first half shaft; the planet carrier is in splined connection with the second half shaft; the power coupling differential is connected to the reducer through the differential end cover; the power coupling differential is connected to the TV coupler through the first sun gear; the first planet gear is rotatably supported on the differential housing through the first planet gear shaft; and the clutch is arranged between the differential housing and the first sun gear.

6. The electric drive axle of claim 5, wherein the clutch is configured to be controlled to enable switching of the power coupling differential between the torque coupling mode and the speed coupling mode;
　　when the clutch is in an engaged state, the differential housing is connected to the first sun gear, and at this time, the power coupling differential operates in the torque coupling mode; and
　　when the clutch is in a disengaged state, the differential housing is disconnected from the first sun gear, and at this time, the power coupling differential operates in the speed coupling mode.

7. The electric drive axle of claim 5, wherein a control signal cable and a power supply cable of the clutch successively pass through a radial gap between the clutch and the second housing and a wiring hole of the second housing to access outside.

8. The electric drive axle of claim 1, wherein the primary drive motor is a hollow-shaft inner-rotor permanent magnet synchronous motor, and is configured to output power through an output shaft of the primary drive motor; the auxiliary drive motor is a hollow-shaft outer-rotor permanent magnet synchronous motor, and is configured to output power through an outer housing rotor of the auxiliary drive motor; and the primary drive motor is arranged at one side of the power coupling differential, and the auxiliary drive motor is arranged at the other side of the power coupling differential.

* * * * *